(12) United States Patent  
Yamada

(10) Patent No.: US 7,972,722 B2
(45) Date of Patent: Jul. 5, 2011

(54) LEAD SEALANT FILM AND NON-AQUEOUS ELECTROLYTE BATTERY

(75) Inventor: Hiroyuki Yamada, Fukushima (JP)

(73) Assignee: Sony Corporation, Tokyo (JP)

( * ) Notice: Subject to any disclaimer, the term of this patent is extended or adjusted under 35 U.S.C. 154(b) by 194 days.

(21) Appl. No.: 12/013,074

(22) Filed: Jan. 11, 2008

(65) Prior Publication Data

US 2008/0213659 A1 Sep. 4, 2008

(30) Foreign Application Priority Data

Feb. 5, 2007 (JP) .................................. 2007-025475

(51) Int. Cl.
*H01M 2/08* (2006.01)
*H01M 2/02* (2006.01)

(52) U.S. Cl. ......... 429/184; 429/178; 429/179; 429/181

(58) Field of Classification Search .................... 429/181
See application file for complete search history.

(56) References Cited

U.S. PATENT DOCUMENTS

| | | | |
|---|---|---|---|
| 5,510,180 A * | 4/1996 | Liu et al. ....................... | 428/532 |
| 5,730,919 A * | 3/1998 | Wilfong et al. .......... | 264/173.11 |
| 6,797,430 B1 * | 9/2004 | Hatta et al. .................... | 429/181 |
| 7,008,721 B2 * | 3/2006 | Yamashita et al. ............ | 429/184 |
| 7,396,613 B2 * | 7/2008 | Hiratsuka et al. ............. | 429/176 |
| 2010/0179268 A9 * | 7/2010 | Jiang et al. .................... | 524/487 |

FOREIGN PATENT DOCUMENTS

| | | |
|---|---|---|
| JP | 56-071278 | 6/1981 |
| JP | 06285948 A * | 10/1994 |
| JP | 2000-268789 | 9/2000 |
| JP | 2001-297748 | 10/2001 |
| JP | 2002-216720 | 8/2002 |
| JP | 2002-245988 | 8/2002 |
| JP | 2003-007264 | 1/2003 |
| JP | 2003-007265 | 1/2003 |
| JP | 2003-007268 | 1/2003 |
| JP | 2004-095543 | 3/2004 |
| JP | 2004-319098 | 11/2004 |
| WO | 00/26976 | 5/2000 |

OTHER PUBLICATIONS

Japanese Office Action issued on Mar. 19, 2009, for corresponding Japanese Patent Application JP 2007-025475.

* cited by examiner

*Primary Examiner* — Dah-Wei D Yuan
*Assistant Examiner* — Thomas Wallen
(74) *Attorney, Agent, or Firm* — K&L Gates LLP

(57) ABSTRACT

A lead sealant film and a non-aqueous electrolyte battery are provided. The lead sealant film includes a laminated structure composed of an inner layer, an intermediate layer, and an outer layer. The intermediate layer includes a first acid-modified polypropylene having a high melting-point, and each of the inner layer and the outer layer includes a second acid-modified polypropylene having a low melting-point. A difference between the melting point of the first acid-modified polypropylene and the melting point of the second acid-modified polypropylene is from 20° C. to 25° C.

12 Claims, 5 Drawing Sheets

LEAD SEALANT FILM AND NON-AQUEOUS ELECTROLYTE BATTERY

CROSS REFERENCES TO RELATED APPLICATIONS

The present application claims priority to Japanese patent Application No. 2007-25475 filed in the Japanese Patent Office on Feb. 5, 2007, the entire contents of which is incorporated herein by reference.

BACKGROUND

The present application relates to a lead sealant film and a non-aqueous electrolyte battery. More particularly, it relates to a lead sealant film for use in sealing an electrode terminal lead and the improvement of a non-aqueous electrolyte battery using the lead sealant film.

In recent years, a variety of portable electronic devices, such as camera-integrated video tape recorders (VTRs), cellular phones, and portable computers, have widely spread, which are reduced in size and weight. As a portable power source for these electronic devices, a battery, particularly a secondary battery, especially a non-aqueous electrolyte secondary battery (so-called lithium-ion battery) is being vigorously studied and developed for obtaining a battery which can be further reduced in thickness or which can be bent.

With respect to the electrolyte for such a battery which is a flexible form, vigorous studies are made on a solid electrolyte, and especially a gel electrolyte, which is a solid electrolyte containing a plasticizer, and a polymer solid electrolyte including a lithium salt dissolved in a polymer have attracted attention.

On the other hand, fully utilizing the merits of the above thin and lightweight battery, various studies are made on a battery of a type such that a battery element is sealed using a plastic film or a so-called laminated film including a plastic film and a metal which are laminated together. In the battery of this type, an important issue is to achieve sealing reliability equivalent to or higher than that of a metal can.

For example, when using an external packaging material composed of a plastic film formed from a resin solely like a known battery (see Japanese Unexamined Patent Application Publication No. 2000-268789 which is herein referred to as "patent document 1"), moisture penetration through resin or volatilization of the electrolyte by entering the battery through resin inevitably occurs. Therefore, the use of the plastic film formed from a resin solely is not suitable for the battery utilizing a solid electrolyte using an organic solvent.

For solving the above issue, the use of, for example, an aluminum laminated pack containing a metallic foil in the external packaging film is effective, but, in this case, another serious issue of the occurrence of short-circuiting arises.

A strip-form electrode terminal is introduced from the heat-sealing interface of the external packaging, and, for example, the edge face of the metallic foil of the external packaging material exposed at the edge face of the outlet for the electrode terminal is bought into contact with the electrode terminal to cause short-circuiting. Alternatively, when heat-sealing is conducted at a temperature and a pressure which exceed the respective appropriate temperature range and pressure range, the surface of the metallic foil exposed due to flow of the resin is bought into contact with the electrode terminal to cause short-circuiting.

For solving these issues, a sealant film having a three-layer structure composed of a heat resistant layer sandwiched between other resin layers has been proposed (see, for example, patent documents 2, 3, 4, and 5).

[Patent document 2] Japanese Unexamined Patent Application Publication No. 2000-268789
[Patent document 3] Japanese Unexamined Patent Application Publication No. 2004-095543
[Patent document 4] Japanese Unexamined Patent Application Publication No. 2002-245988
[Patent document 5] Japanese Unexamined Patent Application Publication No. 2002-216720

However, in the developing technologies described above the patent documents 2, 3, and 4, the melting point of each resin layer is not specified, and the constituent resins are not of the same system, and therefore, when forming a three-layer structure, it is necessary to bond the low melting-point resin (layer) and the high melting-point resin (layer) together using a bonding agent. The bonding agent inevitably experiences heat conditions at least two times, namely, during forming the sealant film and final sealing for the battery, and further the battery is possibly stored in a high-temperature environment, and hence there is apprehension that delamination of the bonding agent due to the electrolyte is caused.

On the other hand, in the battery described in the patent document 5, lamination of resins of the same system by extrusion is disclosed, but a film for use is a film subjected to an electron-beam cross-linked on one side, which leads to increase the cost.

SUMMARY

Accordingly, it is desirable to provide a lead sealant film which is advantageous not only in that it needs no bonding agent and has both sealing properties with high reliability and excellent short-circuit resistance, but also in that it can be produced at low cost, and a non-aqueous electrolyte battery using the lead sealant film.

The present inventors have studied diligently toward improvement of the sealant film and non-aqueous electrolyte battery. As a result, it has been found that the improvement is accomplished by employing a laminate structure using acid-modified polypropylenes having a predetermined difference in melting point in the lead sealant film.

In accordance with an embodiment, there is provided a lead sealant film for use in sealing an electrode terminal lead of non-aqueous electrolyte battery: including a laminated structure composed of an inner layer, an intermediate layer, and an outer layer; the intermediate layer including a first acid-modified polypropylene having a high melting-point, and each of the inner layer and the outer layer including a second acid-modified polypropylene having a low melting-point; and a difference between the melting point of the first acid-modified polypropylene and the melting point of the second acid-modified polypropylene is from 20° C. to 25° C.

In accordance with another embodiment, there is provided a non-aqueous electrolyte battery including: a battery element including a positive electrode and a negative electrode which are spirally wound or stacked through a separator; an external packaging material, composed of a laminated film, for packaging the battery element; and a heat-sealing portion for sealing the external packaging material along the periphery of the battery element while introducing electrode terminal leads for the positive electrode and the negative electrode to the outside. Each of the electrode terminal leads is covered with a lead sealant film at a position corresponding to the heat-sealing portion. The lead sealant film includes a laminated structure composed of an inner layer, an intermediate layer, and an outer layer, the intermediate layer including a first acid-modified polypropylene having a high melting-point, and each of the inner layer and the outer layer including a second acid-modified polypropylene having a low melting-point; and a difference between the melting point of the first acid-modified polypropylene and the melting point of the second acid-modified polypropylene is from 20° C. to 25° C.

Additional features and advantages are described herein, and will be apparent from, the following Detailed Description and the figures.

DETAILED DESCRIPTION

The lead sealant film and non-aqueous electrolyte battery of embodiments will be described in detail with reference to the accompanying drawings according to embodiments. In the present specification, with respect to the concentration, content, amount, and the like, "%" is given by weight unless otherwise specified.

Figure 1:
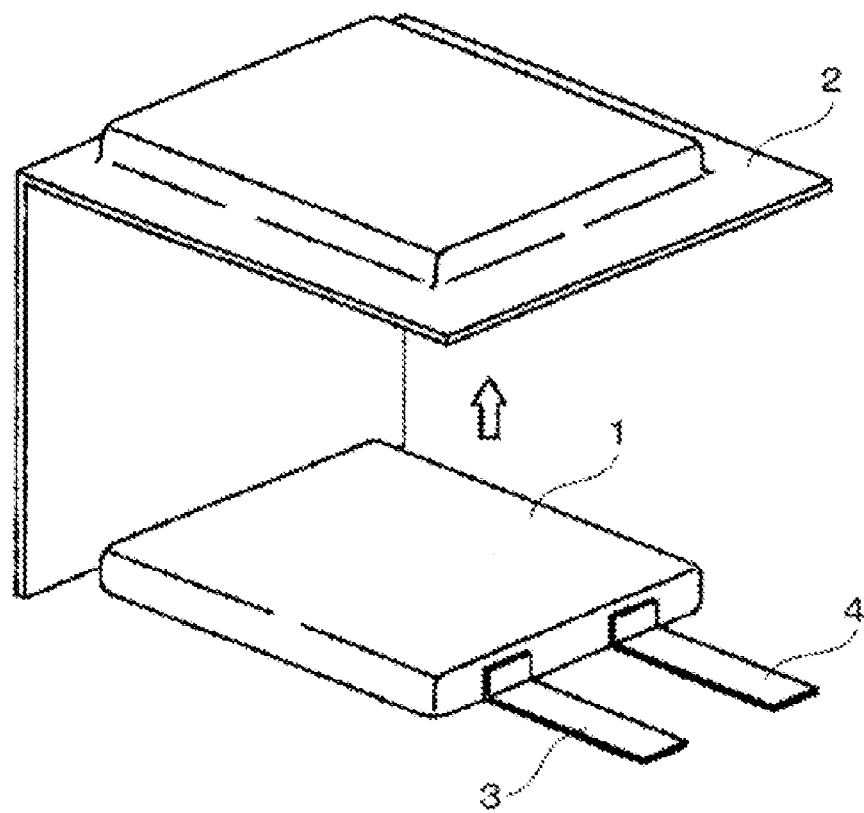
FIG. 1 is an exploded perspective view showing a non-aqueous electrolyte battery according to an embodiment.
Figure 2:
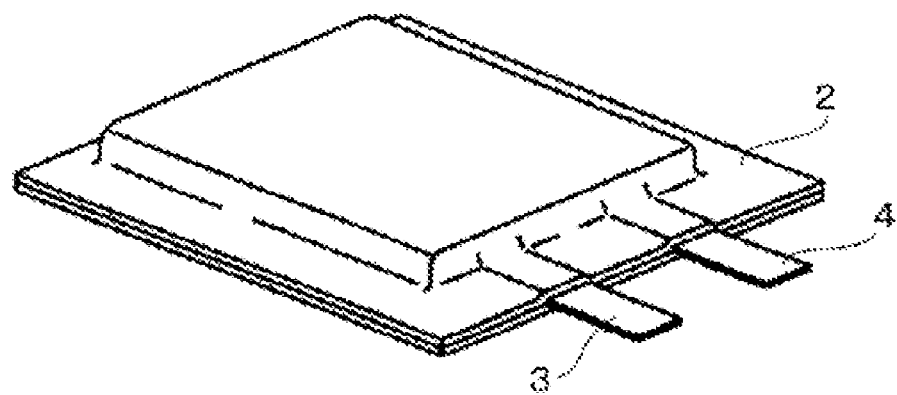
FIG. 2 is a diagrammatic perspective view showing the non-aqueous electrolyte battery according to an embodiment.

The non-aqueous electrolyte battery of an embodiment is, for example, a solid electrolyte battery or gel electrolyte battery, and a non-aqueous electrolyte battery according to an embodiment includes, as shown in FIGS. 1 and 2, a battery element 1 including a solid electrolyte or gel electrolyte disposed between a cathode active material layer and an anode active material layer, and a battery element external packaging material 2 composed of a laminated film, wherein the battery element is contained and sealed in the external packaging material by heat-sealing the periphery of the external packaging material.

The battery element 1 has a negative electrode terminal lead 3 electrically connected to a negative electrode constituting the battery element 1, and a positive electrode terminal lead 4 electrically connected to a positive electrode constituting the battery element 1, and the negative electrode terminal lead 3 and positive electrode terminal lead 4 which are examples of the electrode terminal lead are introduced to the outside of the external packaging material 2.

In the non-aqueous electrolyte battery according to an embodiment, in sealing the battery element 1 in the external packaging material, with respect to each of the negative electrode terminal lead 3 and the positive electrode terminal lead 4 which are sandwiched between the heat-sealing portions of the external packaging material 2 and exposed to the outside of the external packaging material 2, at least a portion to be sandwiched between the heat-sealed laminated films is covered with a lead sealant film to obtain satisfactory adhesion to the terminal metal and satisfactory adhesion to the laminated film innermost layer without sacrificing the resistance to moisture penetration.

Figure 3:
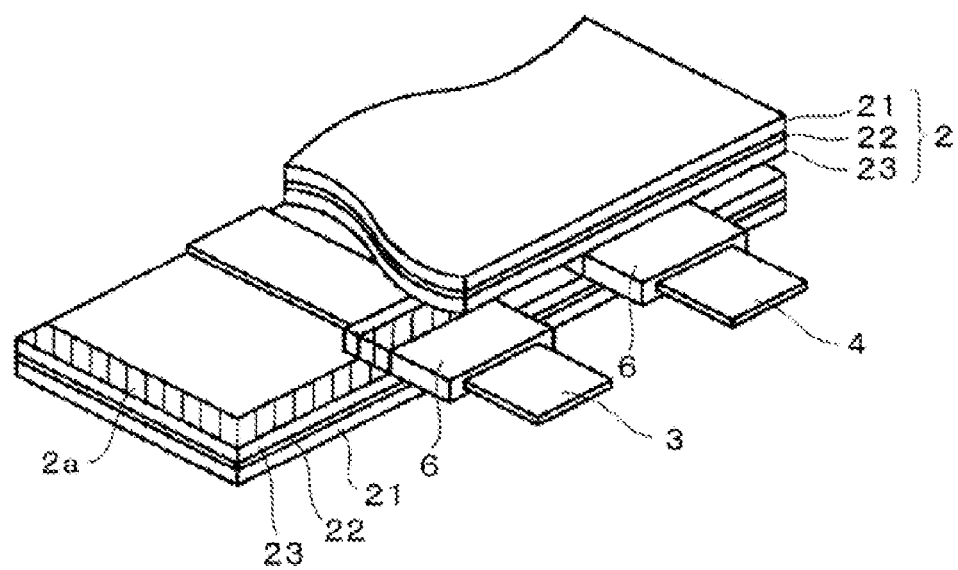
FIG. 3 is a diagrammatic perspective and partially broken view showing a heat-sealing portion of the external packaging material.

This structure is shown in FIG. 3. The external packaging material 2 is composed of three layers, for example, an external packaging protective layer 21, an aluminum layer 22, and a heat-sealing layer (laminate innermost layer) 23, and is sealed by heat-sealing a periphery of the layers. Therefore, the periphery of the external packaging material 2 with a predetermined width constitutes a heat-sealing portion 2a, and the heat-sealing layers 23 are heat-sealed together at the portion.

Accordingly, the negative electrode terminal lead 3 and positive electrode terminal lead 4 are introduced across the heat-sealing portion 2a to the outside of the external packaging material 2.

According to an embodiment, the negative electrode terminal lead 3 or positive electrode terminal lead 4 is covered with a lead sealant film 6 at a position corresponding to the heat-sealing portion 2a.

Figure 4:
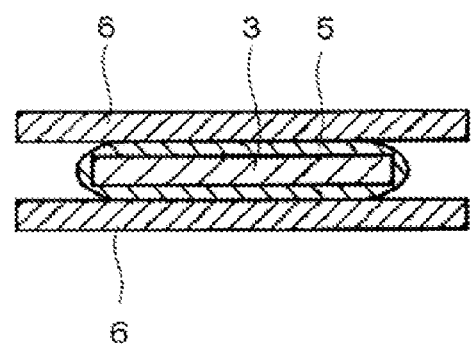
FIG. 4 is a diagrammatic cross-sectional view showing an example of the construction of a sealant film for the negative electrode terminal lead.

FIG. 4 shows an example of the covering structure for the negative electrode terminal lead 3, and the negative electrode terminal lead 3 is first covered with a primer layer 5 (which may be omitted), and further covered with the sealant film 6.

In the present embodiment, the sealant film 6 is composed of upper and lower resin layers 61, 62 each having a three-layer structure, and the negative electrode terminal lead 3 is disposed between the resin layers 61, 62 and they are together heat-sealed.

Figure 5:
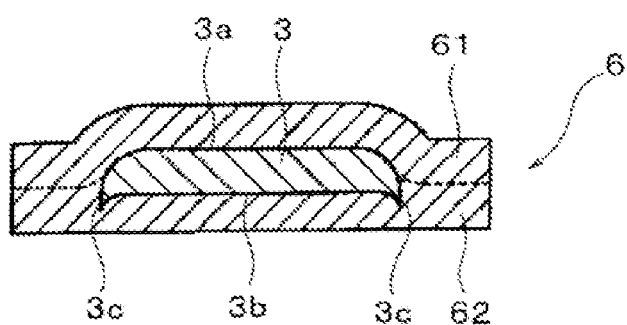
FIG. 5 is a diagrammatic cross-sectional view showing the covering state of the electrode terminal lead with the sealant film.

The resin layer 61 is in contact with one principal surface 3a of the negative electrode terminal lead 3, and the resin layer 62 is in contact with another principal surface 3b of the negative electrode terminal lead 3, and at least the resin layer 61 in contact with the one principal surface 3a is deformed according to the shape of the negative electrode terminal lead 3 as shown in FIG. 5, and has an uneven surface reflecting the shape of the negative electrode terminal lead 3.

By virtue of this covering state, the penetration of the negative electrode terminal lead 3 into the sealant resin 6 becomes very small, and, for example, even when burr 3c is formed in the negative electrode terminal lead 3, the burr does not break through the sealant film 6 (especially the resin layer 62) to cause short-circuiting.

The sealant film 6 flows in a satisfactory amount along the periphery of the burr or both side edges of the negative electrode terminal lead 3, and a defect which inhibits sealing is not caused, thus ensuring a satisfactory sealing properties.

For obtaining the above-mentioned covering state, a heat sealing apparatus provided with an elastic body is used.

Figure 6:
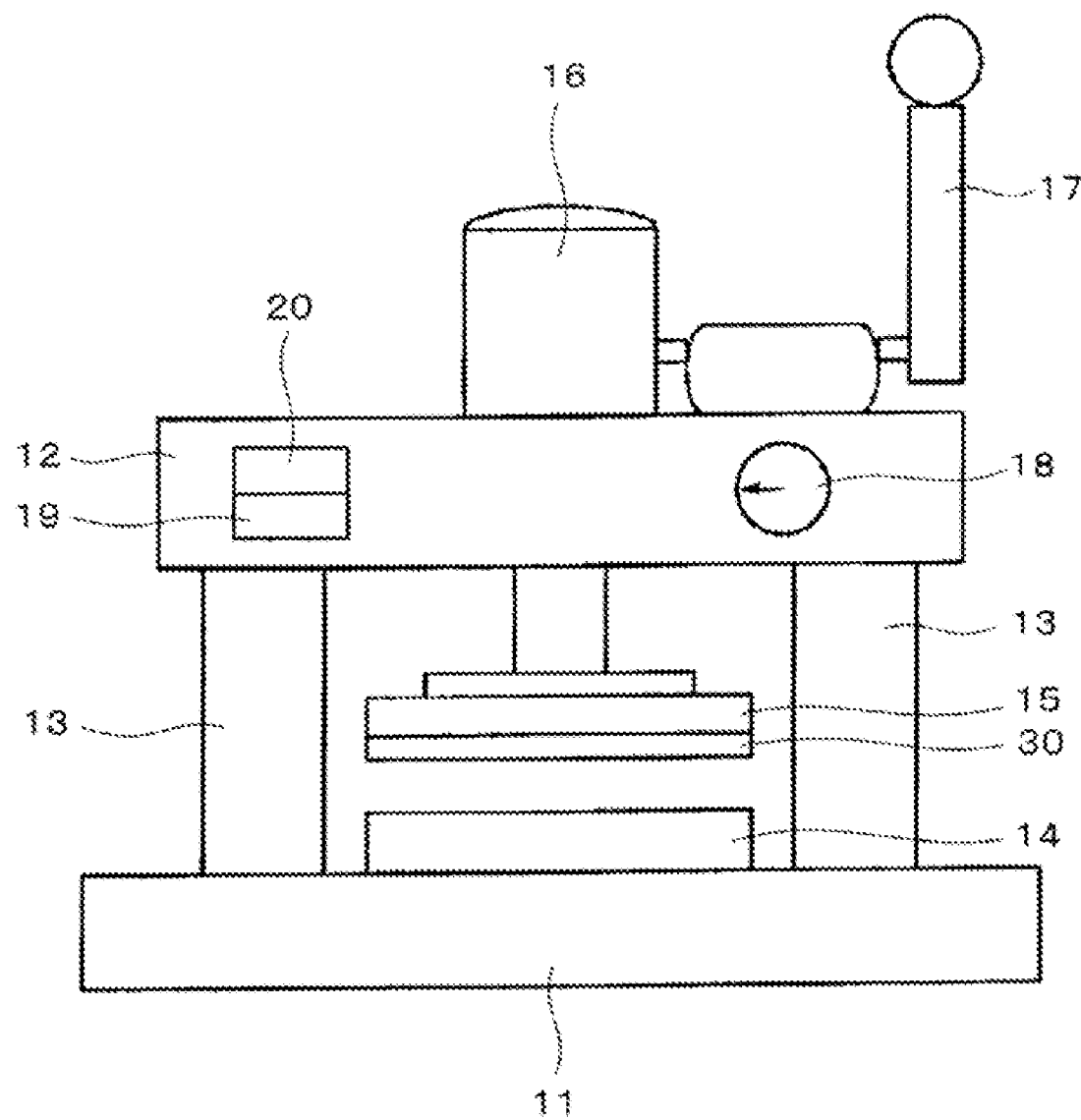
FIG. 6 is a diagrammatic front view showing an example of the construction of a heat sealing apparatus.

FIG. 6 shows an example of a heat sealing apparatus used in covering the electrode terminal lead with the sealant film.

The heat sealing apparatus has a pair of upper and lower heater-head supporting substrates 11, 12, which are supported by strut 13 and disposed to face each other with a predetermined space.

The heater-head supporting substrate 11 serves as a base for supporting the heat sealing apparatus itself, and one heater head 14 is attached in a fixed state to the heater-head supporting substrate.

On the other hand, the heater-head supporting substrate 12 supports another heater head 15 so that the heater head can move up and down, and allows the heater head 15 to move down to dispose a material to be heat-sealed between the heater heads 14, 15.

A pump 16 for applying a pressure to the heater head 15 is provided on the heater-head supporting substrate 12. The pump 16 has a pressure control handle 17 for controlling the pressure applied, which enables control of the pressure applied to a material to be heat-sealed.

In addition, the heater-head supporting substrate 12 has a pressure gauge 18 for displaying the pressure applied, a lower heater-temperature control panel 19, and an upper heater-temperature control panel 20.

The heat sealing apparatus has the above-mentioned basic construction, but, in an embodiment, an elastic body 30 is formed on the surface of at least one heater head (the heater head 15 in the present embodiment) which faces the material to be heat-sealed, thus achieving excellent heat-sealing.

It is preferred that the elastic body 30 is composed of a material having a melting point of 100° C. or higher. For example, a silicone rubber, polytetrafluoroethylene, polyurethane, polyimide, polyamide, or polyester can be used. It is preferred that the elastic body 30 has a thickness of 10 μm to 2 cm. Especially, the elastic body having a thickness equal to or larger than the thickness of the electrode terminal lead (generally 0.1 mm or more) exhibits a remarkable effect.

The elastic body 30 on the surface of the heater head 15 can effectively apply a pressure to the portions along both edges of the electrode terminal lead. A tunnel-shaped space is likely to be formed in the portions along both side edges of the electrode terminal lead and lowers the sealing performance, but the elastic body permits the resin to flow along these portions to prevent the formation of tunnel-shaped space. When the elastic body 30 is not provided, a higher pressure must be applied to the surface to be sealed to apply the pressure to the portions along both side edges of the electrode terminal lead. In this case, a burr which the electrode terminal lead inevitably has may be exposed, and brought into contact with the metallic foil of the external packaging film, causing short-circuiting.

Figure 7:
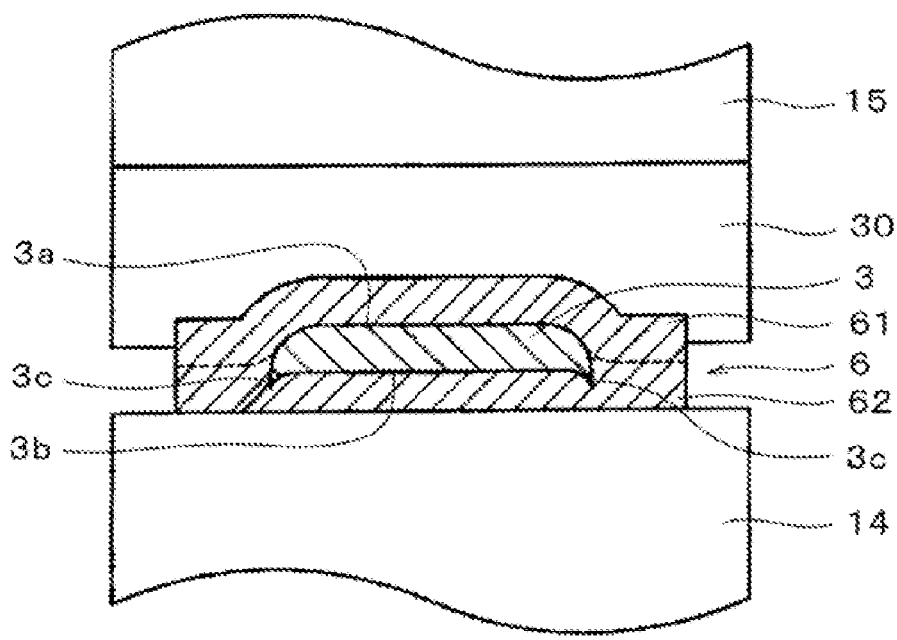
FIG. 7 is a diagrammatic cross-sectional view showing the state of the sealant resin pressed by heater heads.

FIG. 7 shows the state of the lead sealant film 6 pressed by the heater heads 14, 15 having the elastic body 30.

When the resin layers 61, 62 constituting the lead sealant film 6 are put on the both surfaces of the negative electrode terminal lead 3 and they are together disposed between the heater heads 14, 15 and pressed and heated, the elastic body 30 deforms following of the shape of the negative electrode terminal lead 3, so that the resin layer 61 also deforms. Accordingly, after the heat-sealing, the resin layer 61 is deformed following the shape of the negative electrode terminal lead 3, and has an uneven surface reflecting the shape of the negative electrode terminal lead 3.

Thus, by providing with the elastic body 30 on the surface of the heater head 15, an excess pressure is not applied to the negative electrode terminal lead 3, thereby preventing breakage of the film due to the burr 3c.

Further, the sealant film 6 flows in a satisfactory amount along the burr 3c or both side edges of the negative electrode terminal lead 3, so that the sealing properties remain intact.

The above-described heat sealing apparatus provided with an elastic body may be used not only in heat-sealing the electrode terminal lead with a lead sealant film but alto in heat-sealing the periphery of the external packaging material.

Next, the lead sealant film 6 is described.

The lead sealant film 6 has a three-layer laminate structure basically composed of an inner layer, an intermediate layer, and an outer layer. The intermediate layer is composed of or contains an acid-modified polypropylene having a high melting-point, and each of the inner layer and the outer layer is composed of or contains an acid-modified polypropylene having a low melting-point.

In the sealant film of an embodiment, the difference in melting point between the high melting-point polypropylene and the low melting-point polypropylene is 20° C. to 25° C.

The acid-modified polypropylene has both adhesion property to the electrode terminal lead and good heat-sealability with the external packaging material, and polypropylene being modified with maleic anhydride and having a molecular weight of 10,000 or more is preferably used.

The high melting-point polypropylene means polypropylene having a melting point of the order of 150° C. to 168° C., and the low melting-point polypropylene means polypropylene having a melting point of the order of 130° C. to 148° C.

When the high melting-point polypropylene has a melting point of lower than 150° C., the difference in melting point between the high melting-point polypropylene and the low melting-point polypropylene is small, and there is a possibility that short-circuiting occurs during the heat-sealing. With respect to the melting point of higher than 168° C. of the high melting-point polypropylene, there is no polypropylene having such high a melting point at present. A co-extrusion method using materials of the same system may not be suitable.

On the other hand, when the low melting-point polypropylene has a melting point of lower than 130° C., the reliability of the sealed portion may not be completely assured from the assumption that a user places the battery pack in a high-temperature environment (e.g., on a dashboard in a car or in front of an air outlet of a heater with fan). When the low melting-point polypropylene has a melting point of higher than 148° C., the difference in melting point between the high melting-point polypropylene and the low melting-point polypropylene may be small, and the sealing temperature is determined according to the low melting-point polypropylene, thus causing short-circuiting.

When the difference in melting point (ΔMp) between the polypropylenes is less than 20° C., the occurrence of short-circuiting may not be satisfactorily prevented. On the other hand, when the difference in melting point is more than 25° C., a sealant film may not be formed by co-extrusion, and separate films are inevitably bonded together using a bonding agent to form a sealant film, so that there is a high possibility that delamination is caused due to the bonding agent layer.

In an embodiment, the difference in melting point between the high melting-point polypropylene and the low melting-point polypropylene is 20° C. to 25° C., and therefore a bonding agent (bonding layer) for bonding films together is not required to form the three-layer structure, namely, a lead sealant film having a three-layer structure can be easily formed by co-extrusion, thus reducing the production cost.

The feature that no bonding agent layer is required makes it possible to obtain a non-aqueous electrolyte battery being free of delamination caused due to the electrolyte and having high reliability.

Further, in an embodiment, it is preferable that the difference in melting point (Δmp) between a resin constituting at least an inner layer of the external packaging material, for example, a cast polypropylene (CPP) resin and the low melting-point polypropylene is 0° C. to 1° C.

By taking into consideration not only the melting point of the sealant film but also the melting point of CPP in an aluminum laminated film as the external packaging material, the short-circuit resistance during the production can be improved, and an electron-beam cross-linked film is not needed, thus reducing the production cost.

When the above difference in melting point is more than 10° C., the temperature for sealing may be increased to the melting point of CPP in an aluminum laminated film or the like as the external packaging material, and the high melting-point polypropylene in the lead sealant having a three-layer structure made for the purpose of preventing short-circuiting may be melted, so that the effect for prevention of the occurrence of short-circuiting may be lowered.

With respect to the amount of the lead sealant film 6 protruding from the external packaging material 2, for preventing, e.g., the occurrence of short-circuiting due to the contact with the metal thin film (aluminum layer 22) constituting the external packaging material 2, it is preferable that the length of the sealant film 6 protruding from the external packaging material 2 is equal to or more than the thickness of the external packaging material 2.

With respect to the range of the length of the protrusion, there is no particular upper limit, and, for example, in a device construction in which the edge face of the terminal lead is connected to an external circuit, the entire surface of the terminal lead may be covered with the lead sealant film 6. From the viewpoint of facilitating the connection, it is preferable that the terminal lead is exposed by 0.5 mm or more.

It is preferable that the lead sealant film 6 has a thickness of 10 μm to 500 μm. When the thickness of the sealant film 6 is too thin, the desired effect may not be satisfactorily obtained. Conversely, when the thickness is too thick, such a thick sealant film disadvantageously forms a step, making it difficult to achieve excellent heat-sealing.

The sealant film 6 may be bonded to the electrode terminal lead either in an independent step or simultaneously with heat-sealing the periphery of the external packaging material 2.

Figure 8:
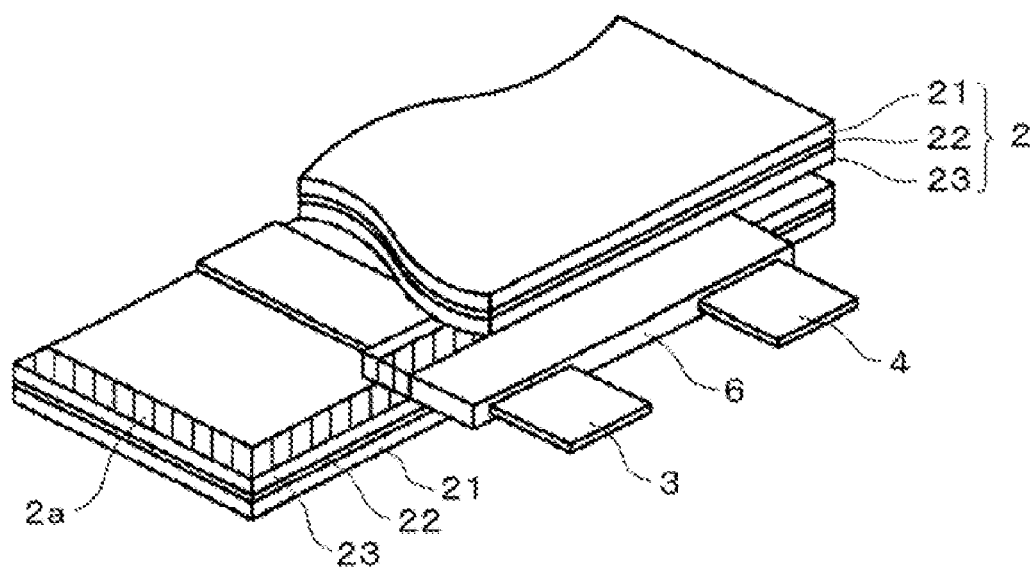
FIG. 8 is a diagrammatic perspective and partially broken view showing an example of a sealant resin collectively covering the negative electrode terminal lead and positive electrode terminal lead.

In the example shown in FIG. 3, the individual lead sealant films 6 are formed respectively for the terminal leads, but, for example, as shown in FIG. 8, the lead sealant film 6 may collectively cover a plurality of terminal leads.

The sealant film 6 may be composed of either a single film which is spirally wound together with an electrode terminal lead or two films which have an electrode terminal lead sandwiched therebetween.

When the battery element 1 is, for example, a solid electrolyte battery or a gel electrolyte battery, as a polymer material used in the polymer solid electrolyte, there can be used silicone gel, acrylic gel, acrylonitrile gel, a polyphosphazene-modified polymer, polyethylene oxide, polypropylene oxide, or a composite polymer, a cross-linked polymer, or a modified polymer thereof, or a fluorine polymer, such as poly(vinylidene fluoride), poly(vinylidene fluoride-co-hexafluoropropylene), poly(vinylidene fluoride-co-tetrafluoroethylene), poly(vinylidene fluoride-co-trifluoroethylene), or a mixture thereof, but the polymer material is not limited to these.

The solid electrolyte or gel electrolyte stacked on the cathode active material layer or anode active material layer is obtained by impregnating a cathode active material layer or anode active material layer with a solution composed of a polymer compound, an electrolyte salt, and a solvent (and further a plasticizer in the case of gel electrolyte), and solidifying the resultant active material layer by removing the solvent.

Part of the solid electrolyte or gel electrolyte stacked on the cathode active material layer or anode active material layer penetrates the cathode active material layer or anode active material layer and is solidified. In a cross-linking system, the active material layer is then cross-linked by light or heat.

The gel electrolyte is composed of a plasticizer containing a lithium salt, and 2% to 30% of a matrix polymer.

An ester, ether, carbonate, or the like may be used solely as the plasticizer or as a component of the plasticizer.

In preparation of the gel electrolyte, as a matrix polymer for gelling a carbonate, a variety of polymers used in constituting a gel electrolyte can be utilized, but, from the viewpoint of achieving excellent oxidation-reduction stability, it is desired that a fluorine polymer, such as poly(vinylidene fluoride) or poly(vinylidene fluoride-co-hexafluoropropylene), is used.

The polymer solid electrolyte is composed of a lithium salt and a polymer compound dissolving the lithium salt. As the polymer compound, an ether polymer, such as poly(ethylene oxide) or a cross-linked polymer thereof, a poly(methacrylate) ester polymer, an acrylate polymer, a fluorine polymer, such as poly(vinylidene fluoride) or poly(vinylidene fluoride-co-hexafluoropropylene), and the like may be used individually or in combination, but, from the viewpoint of achieving excellent oxidation-reduction stability, it is desired that a fluorine polymer, such as poly(vinylidene fluoride) or poly(vinylidene fluoride-co-hexafluoropropylene), is used.

As a lithium salt contained in the gel electrolyte or polymer solid electrolyte, a lithium salt used in a general battery electrolytic solution may be used. As examples of lithium compounds (salts), the lithium compounds may be given as follows, but it is not limited to them.

Examples include lithium chloride, lithium bromide, lithium iodide, lithium chlorate, lithium perchlorate, lithium bromate, lithium iodate, lithium nitrate, lithium tetrafluoroborate ($LiBF_4$), lithium hexafluorophosphate ($LiPF_6$), lithium acetate, lithium bis(trifluoromethanesulfonyl)imide, $LiAsF_6$, $LiCF_3$, $LiCF_3SO_3$, $LiC(SO_2CF_3)_3$, $LiAlCl_4$, and $LiSiF_6$.

These lithium compounds may be used individually or in combination, but, of these, $LiPF_6$ or $LiBF_4$ is preferable from the viewpoint of achieving excellent oxidation stability.

With respect to the gel electrolyte, the concentration of a lithium salt dissolved in a plasticizer may be 0.1 mol to 3.0 mol from a practical point of view, preferably 0.5 mol/l to 2.0 mol/l.

The non-aqueous electrolyte battery of an embodiment may have substantially the same construction as that of a known lithium-ion battery except that the above-mentioned gel electrolyte or solid electrolyte is used.

Specifically, as a negative electrode material constituting a lithium-ion battery, a material capable of being doped with lithium and de-doped may be used. A constituent material of the negative electrode, for example, a carbon material, such as a hardly graphitizable carbon material or a graphite material, may be used. More specifically, a carbon material, such as pyrolytic carbon, coke (pitch coke, needle coke, or petroleum coke), graphite, glassy carbon, a calcined product of an organic polymer compound (obtained by carbonizing a phenolic resin, a furan resin, or the like by calcination at an appropriate temperature), carbon fiber, or activated carbon, may be used.

Further, as a material capable of being doped with lithium and de-doped, a polymer, such as polyacetylene or polypyrrole, or an oxide, such as $SnO_2$, may be used. When forming a negative electrode from the above material, a known binder or the like may be added.

In the positive electrode, according to the type of the desired battery, a metal oxide, a metal sulfide, or a specific polymer may be used as a cathode active material.

For example, when a lithium-ion battery is formed, a metal sulfide or oxide containing no lithium, such as $TiS_2$, $MoS_2$, NbSe, or $V_2O_5$, a lithium-containing composite oxide comprised mainly of $Li_xMO_2$ (wherein M represents at least one transition metal, and x varies depending on the charged or discharged state of the battery, and is generally 0.05 to 1.10), or the like may be used as a cathode active material.

As a transition metal M constituting the lithium-containing composite oxide, Co, Ni, Mn, or the like is preferable. Specific examples of lithium-containing composite oxides include $LiCoO_2$, $LiNiO_2$, $LiNi_yCo_{1-y}O_2$ (wherein $0<y<1$), and $LiMn_2O_4$.

The lithium-containing composite oxide can generate high voltage, and serves as a cathode active material having excellent energy density. In the positive electrode, the cathode active materials may be used in combination. When forming a positive electrode using the above cathode active material, a known conductive material, binder, or the like may be added.

The separator is formed by a porous film composed of a polyolefin material, such as polypropylene (PP) or polyethylene (PE), or a porous film composed of an inorganic material, such as ceramic non-woven fabric, and may be formed by a porous film composed of two or more resins which are mixed and melted together, or have a stacked structure composed of two or more porous films. Especially, a porous film of polypropylene (PP) or polyethylene (PE) may be more effective.

Generally, the usable separator preferably has a thickness of 5 μm to 50 μm, more preferably 7 μm to 30 μm.

If the separator has too large a thickness, the amount of the active material filling the separator is reduced to lower the battery capacity, and further the ion conduction may be lowered, so that the current characteristics become poor. On the other hand, if the separator has too small a thickness, the mechanical strength of film may be poor.

The external packaging laminated film is composed of a multilayer film having a moisture resistance and insulation properties, wherein the multilayer film is formed by a metallic foil sandwiched between an outer resin layer composed of a resin film and an inner resin layer composed of a resin film.

The metallic foil improves the strength of the external packaging material, and further has a major role in preventing moisture, oxygen, or light from penetrating the external packaging material to protect the contents. For example, stainless steel or nickel-plated iron may be appropriately selected as a material for the metallic foil, but, from the viewpoint of reducing the weight, obtaining excellent extensibility, reducing the cost, and easy processing, aluminum (Al) may be more preferable. If needed, a bonding layer may be formed individually between the metallic foil and the outer resin layer and between the metallic foil and the inner resin layer.

In the outer resin layer, nylon (Ny), polyethylene terephthalate (PET), or polyethylene (PE) is used from the viewpoint of achieving good appearance, high toughness, and excellent flexibility, and these may be used in combination.

The inner resin layer is a portion to be melted due to heat or ultrasonic waves and sealed. Polyethylene (PE), cast polypropylene (CPP), polyethylene terephthalate (PET), nylon (Ny), low-density polyethylene (LDPE), high-density polyethylene (HDPE), or linear low-density polyethylene (LLDPE) may be used, and these may be used in combination.

In producing a battery pack using the non-aqueous electrolyte battery of an embodiment, a circuit board or a positive temperature coefficient (PTC) element is disposed.

A circuit board is provided with a connector as an external terminal which is connected to an electronic device, and a protection circuit for protecting the battery.

The circuit board is mounted thereon a protection circuit including a temperature protection element, such as a fuse or a thermistor, an ID resistance for identifying the battery pack, a connector having a contact portion to be electrically connected to an electronic device, and the like. In addition, the protection circuit includes an integrated circuit (IC) for monitoring the secondary battery and controlling a field effect transistor (FET), and a charge-discharge control FET.

As a protection circuit, a PTC element connected to the circuit board and the negative electrode terminal is provided.

The PTC element is connected in series to the battery, and, if the temperature of the battery is higher than a predetermined temperature, the PTC element is rapidly increased in electric resistance to substantially cut off a current flowing the battery.

The fuse or thermistor is also connected in series to the battery, and cuts off a current flowing the battery if the temperature of the battery is higher than a predetermined temperature.

If the terminal voltage of the battery rises to too high a voltage, there is a possibility that it is in a danger such as heat generation or ignition. Therefore, the protection circuit including an IC for monitoring the battery and controlling an FET and a charge-discharge control FET monitors the voltage of the battery, and, if the voltage is higher than a predetermined voltage, the protection circuit turns the charge control FET off to inhibit the charging.

If the battery is over-discharged so that the terminal voltage becomes a discharge cut-off voltage or lower and the secondary battery voltage becomes 0 V, the battery is possibly in an internal short-circuit state such that the battery may not be recharged. Therefore, the protection circuit monitors the secondary battery voltage, and, if the voltage is lower than the discharge cut-off voltage, the protection circuit turns the discharge control FET off to inhibit the discharging.

Examples of structures of the battery element 1 include a structure of a stacked type in which a positive electrode and a negative electrode having a solid electrolyte sandwiched therebetween are alternately stacked through a separator, a structure of a spirally wound type in which a strip positive electrode and a strip negative electrode each having a solid electrolyte applied thereto or formed thereon are spirally wound through a separator, and a structure of a folded type in which a positive electrode and a negative electrode each having a solid electrolyte applied thereto or formed thereon are alternately folded thorough a separator, and a structure of an arbitrary type can be selected.

The present application may be applied to either a primary battery or a secondary battery, but, especially when the present application is applied to a non-aqueous electrolyte secondary battery, remarkable effect can be obtained.

EXAMPLES

Embodiments will be described in more detail with reference to the following Examples and Comparative Examples, which should not be construed as limiting the scope of the present application.

Example 1

Figure 9:
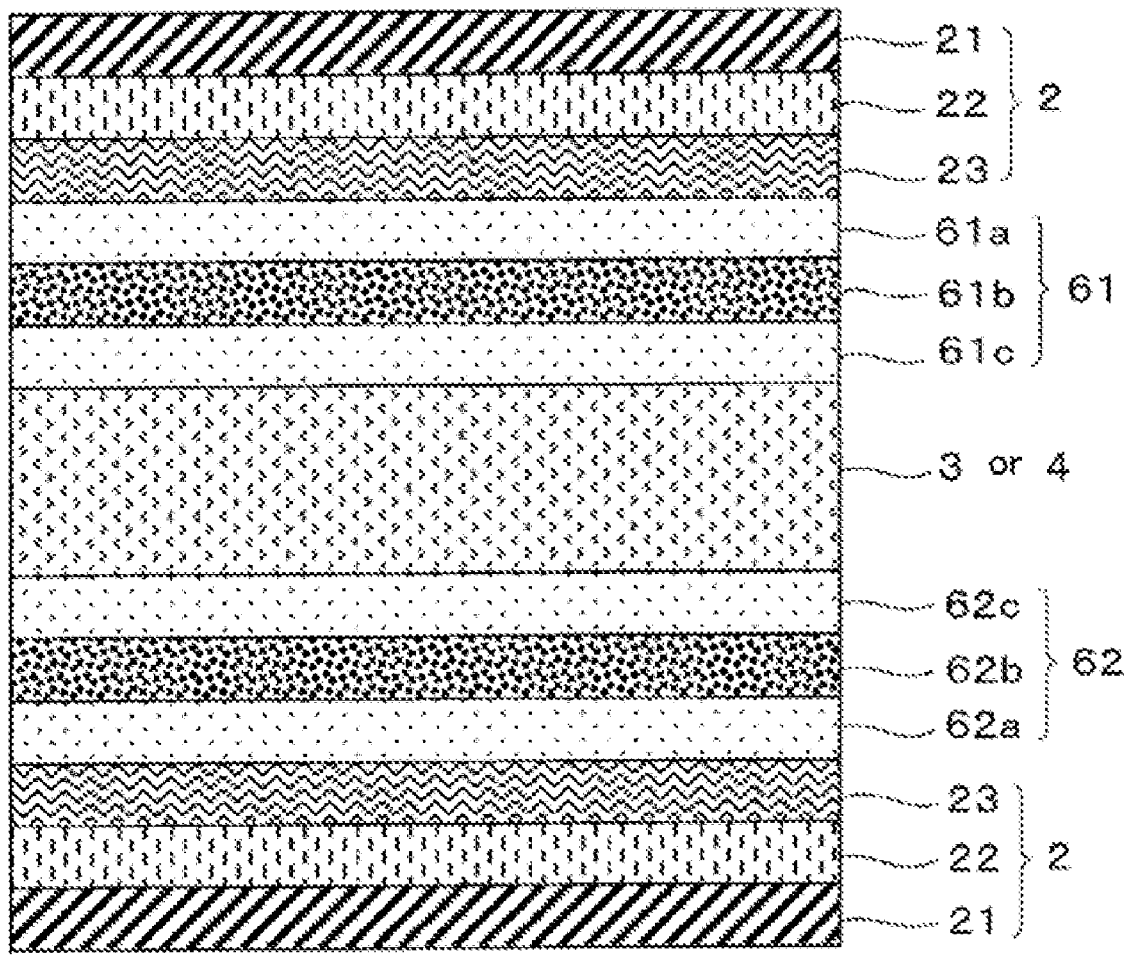
FIG. 9 is a diagrammatic cross-sectional view showing an electrode terminal lead covered with sealant films and further heat-sealed with an external packaging material.

A lead sealant film having a formulation shown in FIG. 9 was prepared. FIG. 9 is a diagrammatic cross-sectional view showing an electrode terminal lead (negative electrode terminal lead 3 or positive electrode terminal lead 4) covered with two sealant films 61, 62 and further heat-sealed with external packaging materials 2.

In the present Example, an acid-modified polypropylene having a high melting-point(melting point: 168° C.) was disposed as intermediate layers 61b, 62b for preventing short-circuiting, an Al strip or a Ni strip was disposed as a metal strip which constitutes the electrode terminal lead 3 or 4, an acid-modified polypropylenes 61c, 62c having a low melting-point (melting point: 143° C.) were disposed for heat-bonding to the metal strip, and an acid-modified polypropylenes having a low melting-point 61a, 62a (melting point: 143° C.) were disposed for heat-bonding to the inner layer (CPP layer) 23 of the external packaging material 2, thus forming a sealant film.

A metal strip (an aluminum strip having a width of 4 mm and a thickness of 70 μm, or a nickel strip having a width of 4 mm and a thickness of 70 μm) constituting a lead was first prepared. Conditions for slitting the metal strip were controlled so that a large burr was formed in slitting the metal strip to easily cause short-circuiting, and a metal strip having a large burr with a size of about 30 μm to 40 μm was selected and used.

Then, sealing was conducted by keeping it under a pressure of 0.3 MPa at a temperature higher by 20° C. than the melting point of the acid-modified polypropylene in contact with the metal strip for 3 seconds. The lead sealant film having the above formulation was heat-bonded onto the lead at 170° C. for 3 seconds, followed by cutting into a predetermined form. After heat-bonding to the lead, the resultant lead was cut into a predetermined length as a lead with sealant, and then welded to carriers of a positive electrode and a negative electrode, and the positive and negative electrodes and a separator were together spirally wound to prepare a battery element.

As the external packaging material, an aluminum laminated film having a nylon layer as an outer layer, an aluminum layer as an intermediate layer, and a CPP layer (melting point: 143° C.) as an inner layer was used.

The aluminum laminated film was shaped into an open container form for containing the battery element, and the battery element was placed in the shaped aluminum laminated film and then the three sides of the film excluding the bent side were sealed using a metal block by keeping the sides of the film under a pressure of 0.3 MPa at a temperature higher by 20° C. than the melting point of the CPP for 3 seconds, obtaining a non-aqueous electrolyte battery (polymer battery) in the present Example.

The formulations of the lead sealant film and the film for external packaging material in the non-aqueous electrolyte battery in the present Example are shown in Table 1.

Example 2

With respect to the formulation of the lead sealant film, an acid-modified polypropylene having a high melting-point (melting point: 168° C.) was disposed as an intermediate layer for preventing short-circuiting, and an acid-modified polypropylene having a low melting-point (melting point: 143° C.) for heat-bonding to the metal strip and for heat-bonding to the CPP layer of the external packaging material was individually disposed on both sides of the intermediate layer.

As the external packaging material, an aluminum laminated film having a nylon layer as an outer layer, an aluminum layer as an intermediate layer, and a CPP layer (melting point: 143° C.) as an inner layer was used.

Substantially the same procedure as in Example 1 was repeated except for the above formulations of the films to prepare a non-aqueous electrolyte battery in the present Example. The formulations of the lead sealant film and the film for external packaging material are shown in Table 1.

Comparative Example 1

With respect to the formulation of the lead sealant film, an acid-modified polypropylene having a low melting-point (melting point: 143° C.) was disposed as an intermediate layer for preventing short-circuiting, and an acid-modified polypropylene having a low melting-point (melting point: 143° C.) for heat-bonding to the metal strip and for heat-bonding to the CPP layer of the external packaging material was individually disposed on both sides of the intermediate layer.

As the external packaging material, an aluminum laminated film having a nylon layer as an outer layer, an aluminum layer as an intermediate layer, and a CPP layer (melting point: 143° C.) as an inner layer was used.

Substantially the same procedure as in Example 1 was repeated except for the above formulations of the films to prepare a non-aqueous electrolyte battery in the present Example. The formulations of the lead sealant film and the film for external packaging material are shown in Table 1.

Comparative Example 2

With respect to the formulation of the lead sealant film, an acid-modified polypropylene having a low melting-point (melting point: 143° C.) was disposed as an intermediate layer for preventing short-circuiting, and an acid-modified polypropylene having a low melting-point, (melting point: 143° C.) for heat-bonding to the metal strip and for heat-bonding to the CPP layer of the external packaging material was individually disposed on both sides of the intermediate layer.

As the external packaging material, an aluminum laminated film having a nylon layer as an outermost layer portion, an aluminum layer as an intermediate layer, and a CPP layer (melting point: 168° C.) as an innermost layer portion was used.

Substantially the same procedure as in Example 1 was repeated except for the above formulations of the films to prepare a non-aqueous electrolyte battery in the present Example. The formulations of the lead sealant film and the film for external packaging material are shown in Table 1.

Comparative Example 3

With respect to the formulation of the lead sealant film, an acid-modified polypropylene having a high melting-point, (melting point: 168° C.) was disposed as an intermediate layer for preventing short-circuiting, and an acid-modified polypropylene having a high melting-point(melting point: 168° C.) for heat-bonding to the metal strip and for heat-bonding to the CPP layer of the external packaging material was individually disposed on both sides of the intermediate layer.

As the external packaging material, an aluminum laminated film having a nylon layer as an outer layer, an aluminum layer as an intermediate layer, and a CPP layer (melting point: 168° C.) as an inner layer was used.

Substantially the same procedure as in Example 1 was repeated except for the above formulations of the films to prepare a non-aqueous electrolyte battery in the present Example. The formulations of the lead sealant film and the film for external packaging material are shown in Table 1.

Comparative Example 4

With respect to the formulation of the lead sealant film, an acid-modified polypropylene having a high melting-point (melting point: 168° C.) was disposed as an intermediate layer for preventing short-circuiting, and an, acid-modified polypropylene having a low melting-point (melting point: 143° C.) for heat-bonding to the metal strip and for heat-bonding to the CPP layer of the external packaging material was individually disposed on both sides of the intermediate layer.

As the external packaging material, an aluminum laminated film having a nylon layer as an outer layer, an aluminum layer as an intermediate layer, and a CPP layer (melting point: 168° C.) as an inner layer was used.

Substantially the same procedure as in Example 1 was repeated except for the above formulations of the films to prepare a non-aqueous electrolyte battery in the present Example. The formulations of the lead sealant film and the film for external packaging material are shown in Table 1.

Comparative Example 5

With respect to the formulation of the lead sealant film, an acid-modified polypropylene having a high melting-point (melting point: 158° C.) was disposed as an intermediate layer for preventing short-circuiting, and an acid-modified polypropylene having a low melting-point (melting point: 143° C.) for heat-bonding to the metal strip and for heat-bonding to the CPP layer of the external packaging material was individually disposed on both sides of the intermediate layer.

As the external packaging material, an aluminum laminated film having a nylon layer as an outer layer, an aluminum layer as an intermediate layer, and a CPP layer (melting point: 143° C.) as an inner layer was used.

Substantially the same procedure as in Example 1 was repeated except for the above formulations of the films to prepare a non-aqueous electrolyte battery in the present Example. The formulations of the lead sealant film and the film for external packaging material are shown in Table 1.

Comparative Example 6

With respect to the formulation of the lead sealant film, polyethylene naphthalate having a high melting point (melting point: 265° C.) was disposed as an intermediate layer for preventing short-circuiting, and an acid-modified polypropylene having a low melting-point (melting point: 143° C.) for heat-bonding to the metal strip and for heat-bonding to the CPP layer of the external packaging material was individually disposed on both sides of the intermediate layer.

As the external packaging material, an aluminum laminated film having a nylon layer as an outer layer, an aluminum layer as an intermediate layer, and a CPP layer (melting point: 143° C.) as an inner layer was used.

Substantially the same procedure as in Example 1 was repeated except for the above formulations of the films to prepare a non-aqueous electrolyte battery in the present Example. The formulations of the lead sealant film and the film for external packaging material are shown in Table 1.

Evaluation of Performance (1) Short-circuit Resistance

With respect to each of the Examples and Comparative Examples, five non-aqueous electrolyte batteries were selected, and individually checked using a tester whether or not short-circuiting between the aluminum layer of the external packaging film and the electrode lead (positive electrode or negative electrode) occurred. The results are shown in Table 1.

(2) Delamination

With respect to each of the Examples and Comparative Examples, five batteries selected were stored in a high-temperature and high-humidity environment at 90% Rh at 80° C. for two weeks, and then individually observed and checked whether or not delamination was caused between the lead and the lead sealant. The results are shown in Table 1.

TABLE 1

| | Formulation of lead sealant film | | | Formulation of film for external packaging material | | Delamination between lead and lead sealant after |
|---|---|---|---|---|---|---|
| | Inner layer | Intermediate layer | Outer layer | Inner layer | Short-circuiting | stored at high temperature |
| Example 1 | PPa (Melting point: 143° C.) | PPa (Melting point: 168° C.) | PPa (Melting point: 143° C.) | CPP (Melting point: 143° C.) | o 5/5 OK | o 5/5 OK |
| Example 2 | PPa (Melting point: 143° C.) | PPa (Melting point: 168° C.) | PPa (Melting point: 143° C.) | CPP (Melting point: 143° C.) | o 5/5 OK | o 5/5 OK |
| Comparative Example 1 | PPa (Melting point: 143° C.) | PPa (Melting point: 143° C.) | PPa (Melting point: 143° C.) | CPP (Melting point: 143° C.) | x 5/5 NG | o 5/5 OK |
| Comparative Example 2 | PPa (Melting point: 143° C.) | PPa (Melting point: 143° C.) | PPa (Melting point: 143° C.) | CPP (Melting point: 168° C.) | x 4/5 NG | o 5/5 OK |
| Comparative Example 3 | PPa (Melting point: 168° C.) | PPa (Melting point: 168° C.) | PPa (Melting point: 168° C.) | CPP (Melting point: 168° C.) | x 4/5 NG | o 5/5 OK |
| Comparative Example 4 | PPa (Melting point: 143° C.) | PPa (Melting point: 168° C.) | PPa (Melting point: 143° C.) | CPP (Melting point: 168° C.) | x 4/5 NG | o 5/5 OK |
| Comparative Example 5 | PPa (Melting point: 143° C.) | PPa (Melting point: 158° C.) | PPa (Melting point: 143° C.) | CPP (Melting point: 143° C.) | ▲ 1/5 NG | o 5/5 OK |
| Comparative Example 6 | PPa (Melting point: 143° C.) | PEN (Melting point: 265° C.) | PPa (Melting point: 143° C.) | CPP (Melting point: 143° C.) | o 5/5 OK | X 2/5 NG |

As can be seen from Table 1, it has been found that in Examples 1 and 2 in which the lead sealant film has an acid-modified polypropylene having a low melting-point disposed as the inner layer and outer layer (portion in contact with the lead or heat-bonded to the CPP of the external packaging film) and has disposed as the intermediate layer high melting-point, an acid-modified polypropylene desirably having a difference in melting point of 20° C. or higher and 25° C. or lower, and a CPP having a low melting-point (melting point: 143° C.) is used as the inner layer of the film for external packaging material, both short-circuiting between the aluminum layer of the film for external packaging material and the lead material and delamination between the lead and the lead sealant when storing at a high temperature and a high humidity can be prevented.

The lead sealant film of embodiments is advantageously used in putting a polymer battery and a battery pack having high reliability on the market.

By contrast, in Comparative Examples 1 to 3 in which the films having the same melting point were used in the lead sealant film, short-circuiting between the burr of the lead and the aluminum layer of the external packaging material occurred.

In Comparative Example 6 in which a high melting-point film, such as PEN (polyethylene naphthalate), is used as the intermediate layer of the lead sealant film, short-circuiting between the burr of the lead and the aluminum layer of the external packaging material did not occur, but the films having a large difference in melting point were bonded together using a bonding agent, and hence delamination was caused due to the constituents of the electrolyte especially when stored at a high temperature.

In the present application, a laminate structure using acid-modified polypropylenes having a predetermined difference in melting point is employed, and therefore there can be provided a lead sealant film which is advantageous not only in that it needs no bonding agent and has both sealing properties with high reliability and excellent short-circuit resistance, but also in that it can be produced at low cost, and a non-aqueous electrolyte battery using the lead sealant film.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A lead sealant film for use in sealing an electrode terminal lead of a non-aqueous electrolyte battery, the lead sealant film comprising:
   a laminated structure composed of an inner layer formed directly on a surface of an intermediate layer and an outer layer formed directly on a surface of the intermediate layer opposite to the surface on which the inner layer is formed; and
   wherein:
   the intermediate layer includes a first acid-modified polypropylene having a first melting-point, and each of the inner layer and the outer layer includes a second acid-modified polypropylene having a second melting-point that is lower than the first melting-point, and
   wherein a difference between the first melting point and the second melting point is from 20° C. to 25° C.,
   wherein the first and second acid-modified polypropylenes are modified with maleic anhydride and have molecular weights of at least 10,000, and
   wherein a difference between the second melting point of the second acid-modified polypropylene and the melting point of a cast polypropylene resin constituting at least an inner layer of an external packaging material of the non-aqueous electrolyte battery is from 0° C. to 10° C.

2. The lead sealant film according to claim 1, wherein the first melting point is from 150° C. to 168° C. and the second melting point is from 130° C. to 148° C.

3. The lead sealant film according to claim 1, wherein the first acid-modified polypropylene and the second acid-modified polypropylene each have an adhesion property to the electrode terminal lead and good heat-sealability with an external packaging material.

4. A non-aqueous electrolyte battery comprising:
   a battery element including a positive electrode and a negative electrode which are spirally wound or stacked through a separator;
   an external packaging material, composed of a laminated film, for packaging the battery element; and
   a heat-sealing portion which seals the external packaging material along the periphery of the battery element while introducing electrode terminal leads for the positive electrode and the negative electrode to the outside,
   wherein each of the electrode terminal leads is covered with a lead sealant film at a position corresponding to the heat-sealing portion, and
   the lead sealant film includes:
   a laminated structure composed of an inner layer formed directly on a surface of an intermediate layer and an outer layer formed directly on a surface of the intermediate layer opposite to the surface on which the inner layer is formed, and
   wherein the intermediate layer includes a first acid-modified polypropylene having a first melting-point and each of the inner layer and the outer layer includes a second acid-modified polypropylene having a second melting-point that is lower than the first melting-point,
   wherein a difference between the first melting point and the second melting point is from 20° C. to 25° C.,
   wherein the first and second acid-modified polypropylenes are modified with maleic anhydride and have molecular weights of at least 10,000, and
   wherein a difference between the second melting point of the second acid-modified polypropylene and the melting point of a cast polypropylene resin constituting at least an inner layer of the external packaging material is from 0° C. to 10° C.

5. The non-aqueous electrolyte battery according to claim 4, wherein:
   the first melting point is from 150° C. to 168° C., and
   the second melting point is from 130° C. to 148° C.

6. The non-aqueous electrolyte battery according to claim 4, wherein the electrode terminal lead is covered with a primer layer at the position corresponding to the heat-sealing portion, and further covered with the lead sealant film.

7. The non-aqueous electrolyte battery according to claim 4, wherein the lead sealant film comprises upper and lower resin layers each having a three-layer structure.

8. The non-aqueous electrolyte battery according to claim 7, wherein one resin layer of the resin layers is in contact with one principal surface of the electrode terminal lead and another resin layer is in contact with another principal surface of the electrode terminal lead, and the resin layer in contact with one principal surface of the electrode terminal lead has an uneven surface reflecting the shape of the electrode terminal lead.

9. The non-aqueous electrolyte battery according to claim 4, wherein the lead sealant film protrudes from the external packaging material to expose the electrode terminal lead by 0.5 mm or more.

10. The non-aqueous electrolyte battery according to claim 4, wherein the lead sealant film has a thickness of 10 μm to 500 μm.

11. The non-aqueous electrolyte battery according to claim 4, wherein the lead sealant film collectively covers a plurality of electrode terminal leads.

12. The non-aqueous electrolyte battery according to claim 4, wherein the first acid-modified polypropylene and the second acid-modified polypropylene each have an adhesion property to the electrode terminal leads and good heat-sealability with the external packaging material.

* * * * *